(12) United States Patent
Liu

(10) Patent No.: US 8,064,416 B2
(45) Date of Patent: Nov. 22, 2011

(54) ROUTE SELECTION IN WIRELESS NETWORKS

(75) Inventor: Hang Liu, Yardley, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 175 days.

(21) Appl. No.: 12/084,600

(22) PCT Filed: Nov. 9, 2005

(86) PCT No.: PCT/US2005/040699
§ 371 (c)(1),
(2), (4) Date: May 6, 2008

(87) PCT Pub. No.: WO2007/055689
PCT Pub. Date: May 18, 2007

(65) Prior Publication Data
US 2009/0135824 A1    May 28, 2009

(51) Int. Cl.
*H04Q 7/24* (2006.01)
(52) U.S. Cl. .......... 370/338; 370/432
(58) Field of Classification Search .......... 370/254, 370/338, 315, 342–347, 401, 432
See application file for complete search history.

(56) References Cited

U.S. PATENT DOCUMENTS

| | | | |
|---|---|---|---|
| 5,987,011 A | | 11/1999 | Toh |
| 6,421,731 B1 * | | 7/2002 | Ciotti et al. .......... 709/238 |
| 6,446,126 B1 * | | 9/2002 | Huang et al. .......... 709/226 |
| 6,535,498 B1 | | 3/2003 | Larsson et al. |
| 7,079,509 B2 * | | 7/2006 | Belcea .......... 370/330 |
| 7,177,295 B1 * | | 2/2007 | Sholander et al. .......... 370/338 |
| 7,251,238 B2 * | | 7/2007 | Joshi et al. .......... 370/338 |
| 7,382,740 B2 * | | 6/2008 | Joshi .......... 370/254 |

(Continued)

FOREIGN PATENT DOCUMENTS
EP    1467524    10/2004
(Continued)

OTHER PUBLICATIONS

Perkins, et al. Ad Hoc On-Demand Distance Vector (AODV) Routing for IP Version 6 Draft-Perkins-Manet-AODV6-01.txt., Internet Draft AODV for IPv6, Nov. 10, 2001.

(Continued)

*Primary Examiner* — Chuong T Ho
(74) *Attorney, Agent, or Firm* — Robert D. Shedd; Joseph J. Opalach; Catherine A. Cooper (57) ABSTRACT

A method and apparatus are described for locating a route between a source node and a destination node in an on-demand wireless network including flooding the wireless network with a route request message by the source node and receiving a route reply message responsive to the route request message from a first intermediate node having a valid route to the destination node, wherein the first intermediate node responds to the route request message based on a condition of a flag in the route request message. Also described are a method and apparatus for locating a route between a source node and a destination node in an on-demand wireless network including receiving a route request message from the source node and responding to the route request message with a route reply message by a first intermediate node having a valid route to the destination node, wherein the intermediate node responds to the route request message based on a condition of a flag in the route request message.

38 Claims, 4 Drawing Sheets

U.S. PATENT DOCUMENTS

| | | | |
|---|---|---|---|
| 7,382,759 B2 * | 6/2008 | Joshi et al. | 370/338 |
| 7,522,537 B2 * | 4/2009 | Joshi | 370/254 |
| 7,717,987 B2 | 5/2010 | Kabayashi et al. | |
| 2002/0039357 A1 * | 4/2002 | Lipasti et al. | 370/338 |
| 2004/0141511 A1 * | 7/2004 | Rune et al. | 370/401 |
| 2004/0156318 A1 * | 8/2004 | Rune et al. | 370/235 |
| 2004/0264372 A1 | 12/2004 | Huang | |
| 2004/0264466 A1 | 12/2004 | Huang | |
| 2005/0041627 A1 | 2/2005 | Duggi | |
| 2005/0129000 A1 | 6/2005 | Sivakumar et al. | |
| 2006/0098611 A1 * | 5/2006 | Joshi et al. | 370/338 |
| 2006/0098612 A1 * | 5/2006 | Joshi et al. | 370/338 |
| 2006/0187893 A1 * | 8/2006 | Joshi | 370/338 |
| 2006/0268727 A1 * | 11/2006 | Rangarajan et al. | 370/248 |
| 2007/0070959 A1 * | 3/2007 | Almeroth et al. | 370/338 |
| 2008/0170550 A1 * | 7/2008 | Liu et al. | 370/338 |
| 2010/0061272 A1 * | 3/2010 | Veillette | 370/254 |

FOREIGN PATENT DOCUMENTS

| | | |
|---|---|---|
| JP | 2003516031 | 5/2003 |
| JP | 5005033557 | 2/2005 |
| JP | 2005064723 | 3/2005 |
| JP | 2005191659 | 7/2005 |
| JP | 2005252858 | 9/2005 |
| JP | 2005303998 | 10/2005 |
| RU | 2004103744 | 6/2005 |
| WO | WO0141375 | 6/2001 |
| WO | WO0195641 | 12/2001 |
| WO | 03/061220 A1 | 7/2003 |
| WO | WO2004100454 | 11/2004 |

OTHER PUBLICATIONS

Perkins, et al. RFC3561-Ad Hoc On-Demand Distance Vector (AODV) Routing. The Internet Society (2003).

Perkins, Charles E., et al.: "Ad-hoc On-Deman Distance Vector Routing" Feb. 25, 1999, Proceedings WMCSA, pp. 1-11, XP002173721.

Search Report Dated Mar. 8, 2006.

Johnson et al., "The Dynamic Source Routing Protocol for Mobile Ad Hoc Networks (DSR)", The Dynamic Source Routing Protocol (DSR) for Mobile Ad, 117 pages, Jul. 19, 2004.

Zhao et al., "PARMA. A PHY/MAC Aware Routing Metric for Ad-Hoc Wireless Networks with Multi-Rate Radios", Proceedings of the Sixth IEEE International Symposium on a World of Wireless Mobile and Multimedia Networks (WoWMoM'05), 2005.

* cited by examiner

| ID | LENGTH | MODE FLAGS | TTL | DESTINATION COUNT | HOP COUNT | RREQ ID | ORIGINATOR ADDRESS | ORIGINATOR SEQ. NUM. | METRIC |
|---|---|---|---|---|---|---|---|---|---|
| IR | D | G | RESERVED | DESTINATION ADDRESS #1 | DESTINATION SEQ. NUM. #1 | ..... | IR | D | G | RESERVED | DESTINATION ADDRESS #N | DESTINATION SEQ. NUM. #N |

ROUTE SELECTION IN WIRELESS NETWORKS

This application claims the benefit, under 35 U.S.C. §365 of International Application PCT/US2005/040699, filed Nov. 9, 2005, which was published in accordance with PCT Article 21(2) on May 18, 2007 in English.

FIELD OF THE INVENTION

The present invention relates to wireless networks and, in particular, to wireless mesh networks. Very specifically the present invention relates to processing of route request messages in on-demand routing protocols.

BACKGROUND OF THE INVENTION

On-demand routing protocols, for example, the Ad Hoc On-demand Distance Vector (AODV) routing protocol defined by the MANET working group in IETF, use a Route Request and Route Reply mechanism to establish routes between two nodes in wireless mesh/ad hoc networks. When a source node wants to send data packets/frames to a destination node, the source node discovers the route to the destination by flooding a Route Request (RREQ) message over the network if the source node does not have and needs a valid route to the destination node. A reverse route back to the source is created by the nodes in the network as they receive and forward the RREQ. When a node receives a RREQ, the receiving node replies to this request by generating a Route Reply (RREP) message if either: (1) the receiving node is itself the destination, or (2) the receiving node has a valid route to the destination and the "destination only" ('D') flag in the RREQ is NOT set. The RREP is forwarded in unicast to the source node through the established reverse route and a forward route to the destination in the intermediate nodes and eventually in the source node is thus created. The established routes expire if they are not used within a given route lifetime.

In the AODV, the "destination only" flag of the RREQ message is set by the source node and is not changed by the intermediate nodes. If the "destination only" flag is set in the RREQ by the source node, the intermediate node does not respond to the RREQ with a RREP message even if the intermediate/receiving node has a valid route to the destination node. It forwards/re-floods the RREQ to its neighbors. Only the destination node responds to this RREQ. In this mode of operation, the route discovery latency may be large although the up-to-date best route between the source node and the destination node is eventually discovered in the process. Low latency is very important for real-time applications such as voice and video communications.

If the "destination only" flag is not set by the source node, then any intermediate node with a valid route to the destination node responds to the RREQ with an RREP message. The RREP message is sent back to the source node in unicast and establishes a forward route to the destination node. If the "Gratuitous RREP" ('G') flag in the RREQ is set, this intermediate node also unicasts a gratuitous RREP to the destination node so that the destination node learns of routes to the source node. However, in the AODV, if an intermediate node does generate a RREP (because the intermediate node has a valid route to the destination node), then the intermediate node discards the RREQ. With this approach, the source node can discover a route to the destination node more quickly because the source node does not have to wait for the destination node's reply. However, the best end-to-end route may not be discovered because the route cached in the intermediate node may not be the best route to the destination node. The metrics may have changed due to the dynamics of wireless networks making the cached route less desirable. That is, because of changes in the network topology, routing metrics, etc. it is possible that the route cached in the intermediate node may become worse or that other routes with a better end-to-end metric may become available making other routes more desirable.

The problem solved by the present invention is how to use the RREQ and RREP mechanism to quickly discover the best route between a source node and one or more destination nodes.

SUMMARY OF THE INVENTION

The present invention discloses a method and system for processing/forwarding Route Request (RREQ) messages and generating Route Reply (RREP) messages in on-demand routing protocols, of which AODV is an example, so that the best route can be discovered without incurring significant route discovery delay/latency in wireless mesh/ad hoc networks. Specifically, when a source node wants to discover the route to a destination node, the source node floods the network with a RREQ message with the destination node specified in the destination list and the metric field initialized to 0. The RREQ message contains a new flag "Intermediate Reply (IR)" for each destination node. The source node sets the flag corresponding to the destination node in the RREQ when it initiates the RREQ flooding to discover a route to the destination node(s). During the RREQ flooding, the first intermediate node with a valid route to the destination node responds to the RREQ with an RREP message. The RREP message is sent in unicast towards the source node and thereby quickly establishes a temporary forward route to the destination. Thus, the source node can use this temporary forward route to send data packets/frames with a low route discovery delay/latency. The first intermediate node resets/clears the "IR" flag in the RREQ message and forwards the updated RREQ message downstream towards the destination node. Since the "IR" flag in the RREQ has been reset, the downstream intermediate nodes would not respond to this RREQ and only propagate it even if the downstream intermediate nodes have a valid route to the destination node(s). The RREQs eventually reach the destination node(s). The destination node(s) can select the best route/path based on the end-to-end metrics and send a new RREP back to the source node to establish the best route between the source node and this destination node. If the best path is different from the temporary forward path that was established via the RREP from the intermediate node, the source node will switch to the best path once the best path is established.

A system and method for discovering a route between a source node and a destination node in a wireless network including setting an intermediate reply flag of an route request message by the source node, flooding the wireless network with the route request message and responding to the route request message with a route reply message by a first intermediate node having a valid route to the destination node, are described. The system and method then updating the route request message and re-flooding the wireless network with the route request message. The responding act said responding act thereby establishes a temporary forward route between the source node and the destination node of the wireless network. Also described are a system and method for discovering a best route in which case the route reply message becomes a first route reply message. The system and method for discovering a best route includes selecting by the destination node the best route between itself and the source node based on cumulative metrics received in route request messages received by the destination node, creating a further route reply message and unicasting the further route reply message to the source node. If the temporary forward route is the best route then the further route reply message serves as a confirmation and if the temporary forward route is not the best route then the further route reply message serves to establish the best route upon receipt of the further route reply message by the source node.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

When a source node/mesh point wants to send data packets/frames to some destination node, it checks its routing table for a route. If there is a valid route, it transmits the packets/frames to the next hop specified in the routing table for this destination node. If there is no valid route, the source node initiates route discovery by flooding a Route Request (RREQ) message over the wireless mesh/ad hoc network. The data packets/frames may have originated in/with the node or from the stations associated with the node if the node is a wireless access point. It is possible that a source node needs to discover routes/paths to multiple destination nodes. The source node may disseminate a RREQ for each of destinations or, to reduce the routing overhead, flood the network with a single RREQ message having a list of multiple destination node addresses embedded therein.

Figure 1:
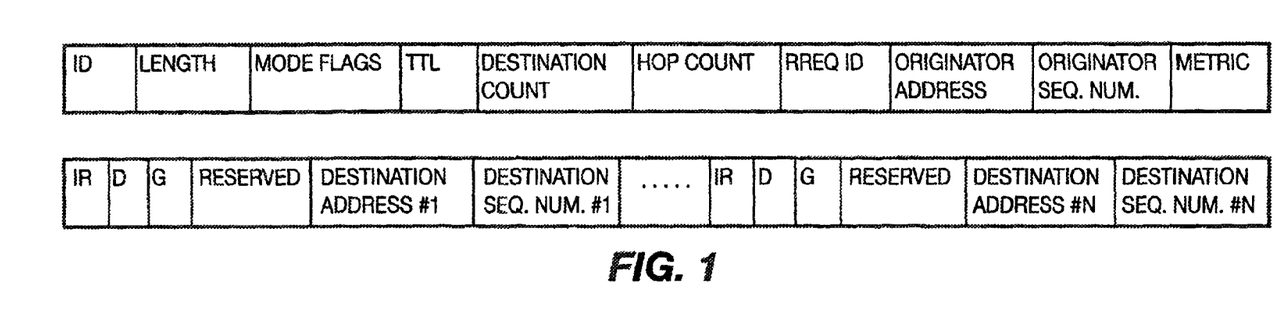
FIG. 1 is an exemplary RREQ message format.

FIG. 1 is an exemplary RREQ message format with other formats possible. The RREQ message contains, for example, the origination/source node address, the originator's sequence number, the destination node address and the destination sequence number (or the number of destinations and the list of destination addresses and their sequence numbers), the RREQ ID, the message ID, the message length, the time-to-live (TTL), the hop count, the routing metric, the flags, and other information. Besides the flags "Destination Only" ('D') and "Gratuitous RREP" ('G'), a new flag, called "Intermediate Reply" (IR) flag herein, is contained in the RREQ message. 'D' and 'G' flags are carried as a legacy of the conventional AODV. These two flags are not set/used by the source node and are ignored by the intermediate and destination nodes. One alternative embodiment is that the RREQ message does not contain 'D' and 'G' flags at all. If the RREQ message carries a list of destination addresses, then multiple "Intermediate Reply" flags are included in the RREQ message, each corresponding to a destination address. When the source node wants to discover a route to one or more destination addresses, it sets the "Intermediate Reply" (IR) flag(s) corresponding to the destination address(es). It should be noted that the destination node address(es) can be internet protocol (IP) address(es) or layer 2 (media access control—MAC) address(es). To adapt to changes in network conditions and to maintain the best metric route between nodes, each active source node may optionally flood the wireless mesh/ad hoc network with a periodic RREQ message (maintenance RREQ) for the destination address(es) with which it is communicating. The "IR" flag in the maintenance RREQ is not set. The intermediate and destination nodes process the maintenance RREQ following the same rules as are used to process a non-maintenance RREQ in the discovery phase.

Thus, it can be seen that dissemination of non-maintenance and maintenance RREQ messages in a wireless mesh/ad hoc network results in establishing/updating a reverse route to the originator (source node) of the RREQ at the intermediate nodes and the destination nodes. Dissemination of non-maintenance RREQ messages also triggers RREP messages from the destination nodes and probably the intermediate nodes. Dissemination of maintenance RREQ messages triggers RREP messages from the destination nodes.

When an intermediate or destination node receives an RREQ message, it creates a reverse route to the source node or updates its current reverse route if the RREQ message passed through a route/path that offered a better metric than the current reverse route to the source node. It should be noted that each node may receive multiple copies of the same RREQ message (originating with the same source node and having the same RREQ ID), each RREQ message traversing a different path from the source node to the receiving/intermediate/destination node. If a reverse route is created or modified or this is the "first copy" of a RREQ message, the RREQ message is forwarded (re-flooded). A "first copy" is used herein to mean that this copy of this RREQ message is the first copy or time that this receiving/intermediate/destination node has received or seen this particular RREQ message identified by its originator address and RREQ ID. When an intermediate node forwards an RREQ message, the metric field in the RREQ message is updated to reflect the cumulative metric of the route to the RREQ's source node from the intermediate node. Furthermore, if the "IR" flag for a destination node in the destination node list of the received RREQ message is set and the intermediate node has a valid route to the destination node, the intermediate node responds to the RREQ message with a route reply RREP message. This route reply message is sent to the source node in unicast and establishes a forward path to the destination node. The source node can then use this route to send data frames/packets to the destination node immediately. If the intermediate node responds to the RREQ message with an RREP message for a destination node in the RREQ destination node list, it resets/clears the "IR" flag for this destination node in the RREQ message before re-flooding the network with the updated RREQ message. The reason to reset the "IR" flag after a RREP message is sent is to suppress any RREP messages from the downstream intermediate nodes. Only the first intermediate node with a valid route to the destination node along the route traversed by the RREQ message flooding replies with an RREP message for this destination node. If the "IR" flag for a destination is reset/cleared in the RREQ message, an intermediate node should not respond with an RREP message even if it has a valid route to the destination node.

After creating/establishing or updating a reverse route to the source node, the destination node sends a unicast RREP message back to the source node. Intermediate nodes create forward routes to the destination node(s) upon receiving the RREP message, and also forward the RREP message toward the source node. When the source node receives the RREP message, it creates a forward route to the destination node. If the destination node receives further RREQ messages with better metrics, then the destination node updates its route to the source node to the new route and also sends a new RREP message back to the source node along the updated route. The new RREP message establishes a better (updated) forward route from the source node to the destination node in the intermediate nodes and eventually the source node. Once this better forward route is established, the source node uses it to send data. Eventually, a bidirectional, best end-to-end metric route is established between the source node and destination node. Using this approach, the source node can quickly obtain a route to the destination node that is established with the RREP message replied to by the intermediate node with a valid route to the destination node. If this route is not the best end-to-end metric route between the source node and destination node, the route is updated to the best route thereafter.

Figure 2:
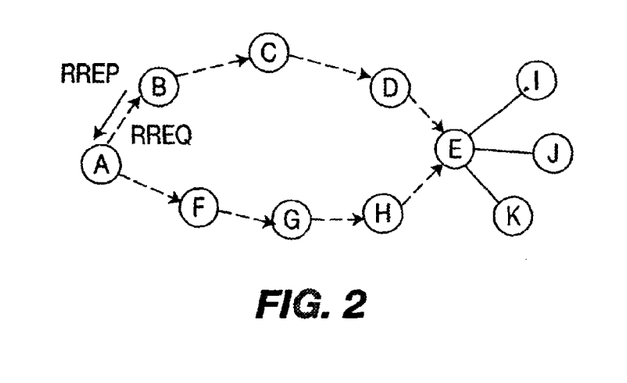
FIG. 2 is schematic diagram of a wireless mesh network in accordance with the principles of the present invention.

Referring now to FIG. 2, which depicts the flooding of the wireless mesh/ad hoc network with the Route Request (RREQ) message and the intermediate node B, with a valid route to the destination node E, responding to the RREQ message with an RREP message. Consider an example in which source node A attempts to discover a route to destination node E. Source node A floods Route Request (RREQ) messages with the "IR" flag set in the wireless mesh/ad hoc network. Assume that intermediate node B already has a valid route B-C-D-E to the destination node E. When intermediate node B responds the RREQ, it creates a reverse route to the source node from which it receives the RREQ as the next hop (source node A) of the reverse route/path. Intermediate node B responds to the RREQ with a unicast RREP because it has a valid route to the destination E and the "IR" flag in the RREQ is set. The RREP establishes a forward route to destination node E in source node A. As soon as source node A creates the route/path to destination node E with the RREP from intermediate node B, source node A can start sending data packets/frames to destination node E via route A-B-C-D-E. Intermediate node B resets the "IR" flag in the RREQ message and forwards it further. The reason to reset the "IR" flag is to limit responses to the RREQ flood to only the first intermediate node with a valid path to the destination node. The other intermediate nodes downstream, e.g. C and D, need not reply to this RREQ with a RREP because the "IR" flag is not set. Assume that intermediate nodes F, G and H do not have valid routes to the destination node E. When intermediate nodes F, G and H receive the flooded RREQ messages, they create the reverse route to the source node A with the node from which each of the intermediate nodes F, G and H receives the RREQ as the next hop of the reverse route. Each of the intermediate nodes F, G and H then forwards the RREQ messages further.

In this example, destination node E receives two copies of this RREQ each traversing a different path: A-B-C-D-E, A-F-G-H-E. Assuming that the two RREQs reached destination node E in the following order: A-B-C-D-E and then A-F-G-H-E, destination node E first creates a route to source node A through intermediate node D as soon as destination node E receives the RREQ along route/path A-B-C-D-E. At this point, the reverse route to the source node A has been established in intermediate nodes B, C and D. Destination node E sends a RREP along the route E-D-C-B-A. The RREP just refreshes the route A-B-C-D-E. If there are any other destination node(s) in the RREQ destination list, for example, node I, destination node E removes itself from the destination list and then forwards the RREQ further (e.g., on to node I). If there are no other destination node(s) in the RREQ's destination list, then the RREQ is not forwarded.

Figure 3:
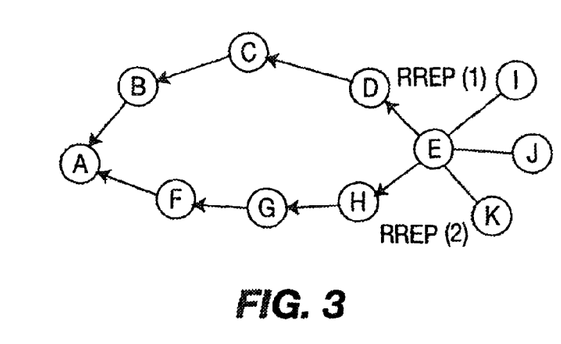
FIG. 3 is schematic diagram of a wireless mesh network in accordance with the principles of the present invention.

Referring now to FIG. 3, which depicts a wireless local area mesh network showing the destination node E replying with a RREP (1) upon receiving the RREQ through A-B-C-D-E and sends a new RREP (2) to establish a better forward route/path after receiving the RREQ through A-F-G-H-E. When destination node E receives the RREQ that came along A-F-G-H-E, destination node E determines that this RREQ came along a path with a better metric to A than the temporary forwarding route/path A-B-C-D-E. Therefore, destination node E modifies/updates the next hop from intermediate node D to intermediate node H and updates the metric. Destination node E then sends a unicast RREP back to source node A through intermediate node H, as well updating and forwarding the RREQ if there are one or more other destination node(s) in the RREQ destination list. The RREP establishes the route to source node A via the intermediate nodes H, G and F. When source node A receives this RREP, it modifies/updates the next hop for destination node E from intermediate node B to intermediate node F. The route to destination node E is changed to A-F-G-H-E.

Figure 4:
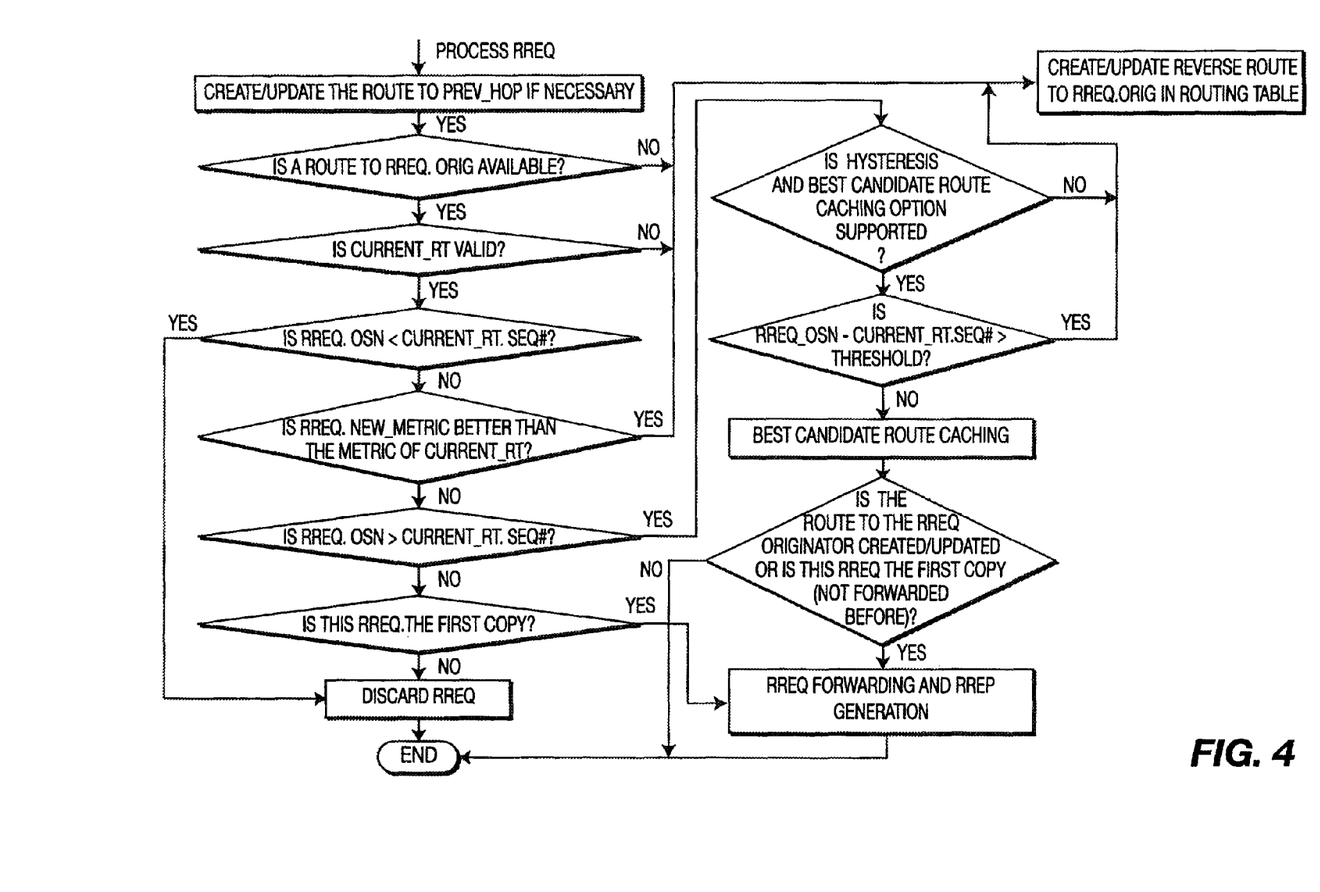
FIG. 4 is a flowchart of an on-demand routing protocol showing where the present invention is used.

Referring now to FIG. 4, which is a flowchart for processing an RREQ message. When a node receives an RREQ message, it first creates/establishes or updates a reverse route to the previous hop from which the node received the RREQ message if necessary at 410. The intermediate/receiving node may then create or update the reverse route to the originator of the RREQ as follows. If a reverse route to the originator of the RREQ message does not exist in the routing table or is invalid at 415 and 420, it is created or updated. The next hop in the routing table for the reverse route for the RREQ originator becomes the previous hop (the node from which the RREQ message was received). If a valid reverse route to the RREQ originator exists, the source sequence number in the RREQ message is compared to the sequence number of the route entry in the routing table at 425 for the reverse route. If the sequence number in the RREQ message is older, it is dropped and no further processing is done at 445. Otherwise, the current reverse route to the originator is modified if the new metric is better than the metric of the current route to the originator in the routing table at 430. The new metric is defined as the metric in the RREQ message plus the link metric between the node from which it received RREQ message and itself. If the new metric is not better than the metric of the current reverse route in the routing table entry, but the source sequence number in the RREQ is greater (newer) than the sequence number in the routing table for the reverse route at 435, the intermediate node checks whether the optional processing functions of hysteresis and best candidate route caching are supported by the mesh network at 450. If these optional processing functions are not supported, the reverse route to the RREQ originator is updated at 455. When a reverse route is created or modified, the sequence number in the routing table for the reverse route is set to the source sequence number in the RREQ message, the next hop becomes the node from which the RREQ message was received, the metric is set to the new metric, and the hop count is set to one more than the hop count in the RREQ message.

If a reverse route to the source node was created or modified, or the RREQ message was the first copy of a new RREQ message (the RREQ ID was not seen from the source before) at 420 and 440, the RREQ forwarding and RREP generation routine described herein is executed at 475. There may be other cases when the RREQ forwarding and RREP generation routine described herein is executed by a node. For example, in some best candidate route caching method, the RREQ messages may be stored in a wait queue with a timer during the candidate route caching. When the wait queue timer expires, the RREQ forwarding and RREP generation routine is executed.

The source node may send periodic maintenance RREQ messages to refresh its active forward and reverse routes. Each time the source sends a maintenance RREQ message is called a route refresh round. It is possible that nodes already having the best reverse route to the source node receive a RREQ message with a newer sequence number but a worse metric route to the source node before receiving the RREQ message through the current best metric route. Additionally, the copy of RREQ message propagated along the current best metric route may be lost during the flooding. These events may result in route flapping. To reduce route flapping and select the best route during each route refresh round, a type of hysteresis and best candidate route caching mechanism may be used. If it is determined at 450 that the hysteresis and best candidate route caching option is implemented by a mesh network, an intermediate node updates the routing table and modifies the reverse route if the source sequence number in the RREQ message is greater (newer) than the sequence number in the routing table entry by a value greater than a threshold. Otherwise, the reverse route may be cached as a potential candidate alternative route at 465.

If the node subsequently learns that the current reverse route has degraded and becomes worse than the candidate reverse route, it is able to change to the candidate route learned earlier in the same refresh round. The present invention describes a method and system to forward an RREQ message and generate an RREP message for discovering the best route without incurring a large route discovery delay/latency in wireless mesh networks. The method of the present invention works with or without hysteresis and best-candidate/alternative route caching.

Figure 5:
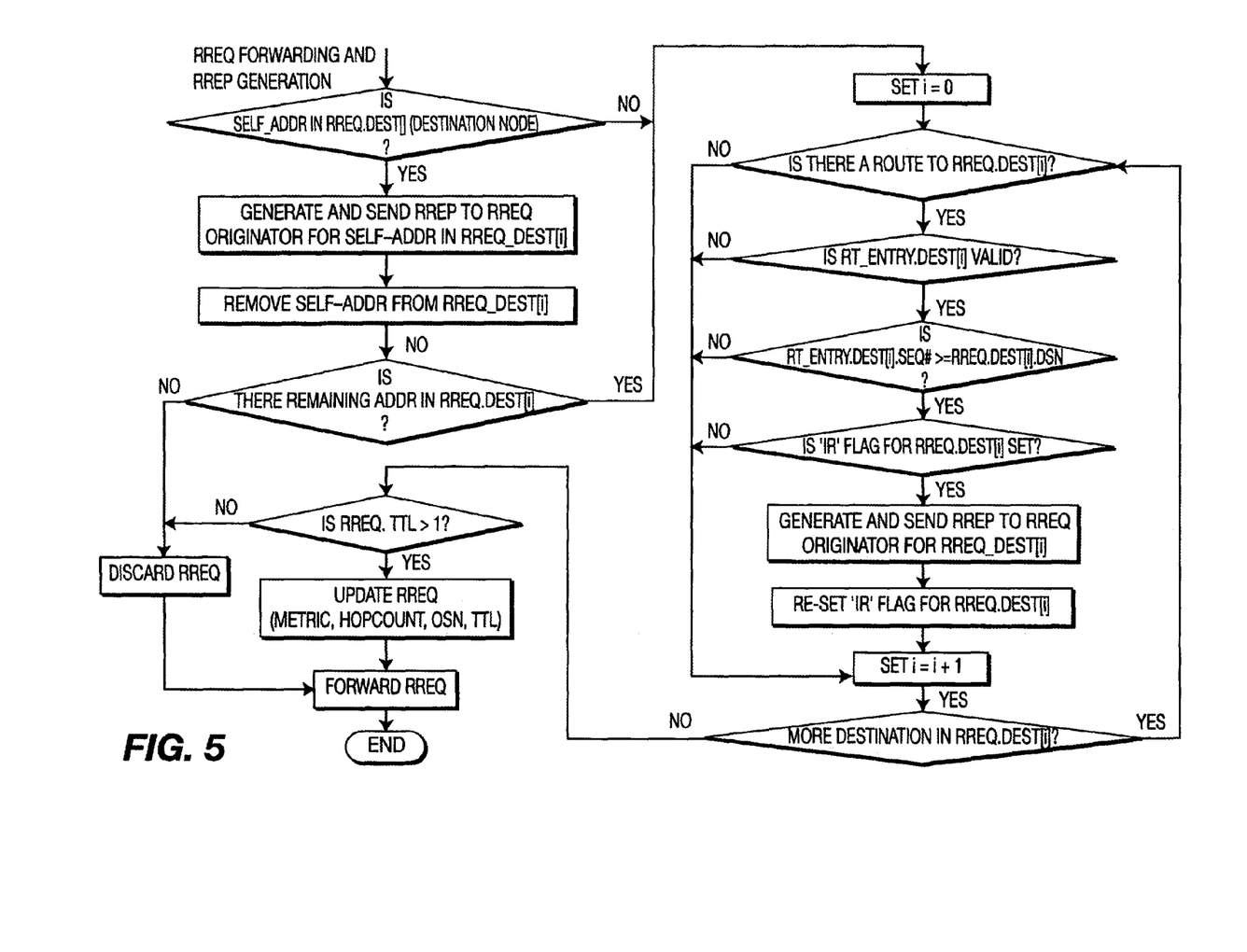
FIG. 5 is a flowchart of the method of the present invention.

Referring now to FIG. 5, which is a flowchart depicting the RREQ forwarding and RREP generation method of the present invention, a node determines if it is a destination node, i.e. if one or more address of the node (self_addr) matches the requested destination addresses in the destination list of the RREQ message rreq.dest at 505. It should be noted that a node itself may have multiple addresses or it may be a proxy for the other nodes. For example, a node may be an access point and generate/manage routing messages on behalf of legacy stations associated with it (a proxy for the stations). The functionality for this case is similar to the situation when a node has multiple addresses. The destination addresses of associated stations may be treated as alias addresses for the access point. A node is a destination node if one or more of the addresses specified in the RREQ message destination list belong to it or one of the nodes using it as the proxy. When a node receives a RREQ message in which the destination node is that of the node proxied by it, it should process the RREQ message as if the destination node address is its own address. Furthermore a node may be a destination node for a requested addresses in the RREQ message destination list, but the intermediate node for another requested address in the RREQ message destination list.

If one or more addresses of the node matches the requested destination addresses in the destination list of the RREQ message, the node generates and sends unicast RREP message to the originator of the RREQ message for these matched destination addresses at 510. A destination node removes its own/proxied address(es) from the RREQ message destination list at 515. After that, if there are no remaining requested addresses in the RREQ message destination list at 520, the RREQ message is discarded at 525. If the node is not a destination node for any requested address in the RREQ message destination list (505) or there are other requested destination addresses in the RREQ message destination list other than the addresses of the node, i.e. the node is an intermediate node for one or more addresses in the RREQ message destination list, the node checks the remaining addresses in the RREQ message destination list as follows. Assume that rreq.dest[i] represents the (i+1)th address in the RREQ message destination list. The node initializes an index (e.g., i) at 545 and checks rreq.dest[i], i.e. the first address in the RREQ message destination list to determine if there is an active forward route to the destination node represented by rreq.dest[i] at 550. If an intermediate node has an active route to the destination, the route to the destination node is valid (555), the sequence number at least as great as that indicated in the original RREQ message (560) and the "Intermediate Reply (IR)" flag is set (570), the intermediate node generates an RREP message for this requested destination address at 575 and sends the generated RREP message in unicast to the originator of the RREQ message along the current reverse route. The "IR" flag for this requested destination in the RREQ message is reset at 580. The node increments the index (for example, by one) and checks if there are any additional addresses in the RREQ message destination list at 590. If there are any additional addresses in the RREQ message destination list then execution of the above-described loop repeats starting at 550. That is, the loop is repeated if an RREP message needs to be sent for next requested destination. The loop is repeated until all the addresses in the RREQ message destination list have been checked.

The original incoming RREQ message is checked to determine if the time-to-live (TTL) value is greater than 1 at 530. If the TTL value is greater than one, then the information in the original RREQ message is updated, including decreasing the TTL value in the outgoing RREQ message, for example, by one at 535. The source sequence number, metric and hop count are also set to the corresponding information in the updated route entry for the source at 535. The updated RREQ message is forwarded at 540.

Notice that a destination node may possess/proxy one or more address and an intermediate node may have valid route (s) to one or more destination addresses. An RREQ message may carry one or more destination addresses in its destination address list. A processing/intermediate/destination node may satisfy the above conditions and send an RREP message for multiple requested addresses in the RREQ message destination list. If a node sends an RREP message for multiple destinations, it may send multiple RREP messages, one for each destination, or it may send a single aggregated RREP message with multiple destination addresses in the address list.

Figure 6:
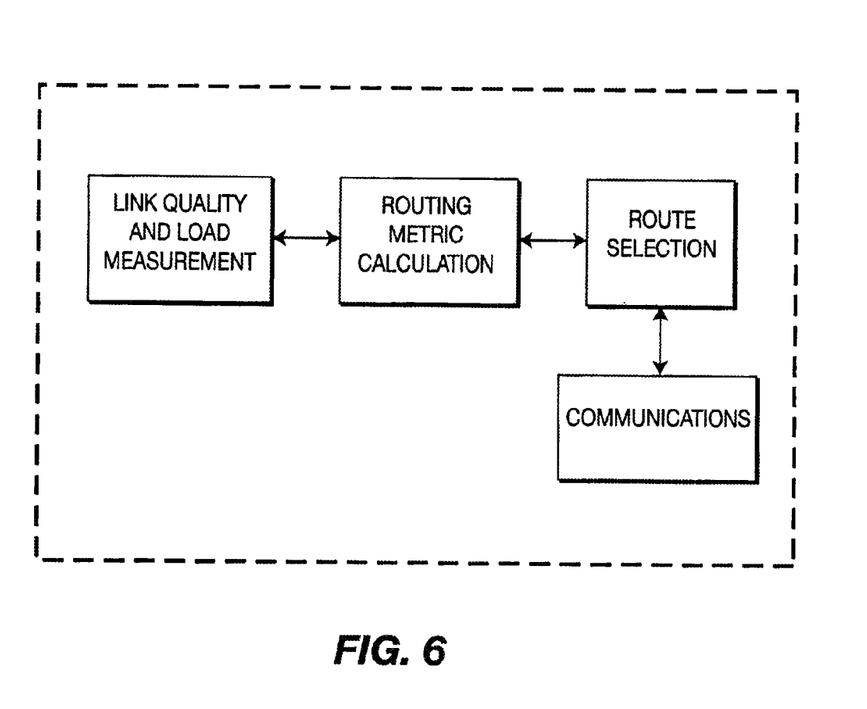
FIG. 6 is a block diagram of a node in accordance with the principles of the present invention.

FIG. 6 is a block diagram illustrating the details of a node 600 of the present invention. The node includes a link quality and load measurement module 605, a routing metric calculation module 610, a route selection module 615 and a communications module 620. The link quality and load measurement module 605 measures the quality and the load of the link/channel to each of its neighbors. It provides the measurement results to the routing metric calculation module 610 so that the routing metric calculation module 610 can determine the link cost/metric to each of its neighbors. Note that a node may have multiple neighbors, multiple radio interfaces, and multiple physical/logical channels/links. All of them need to be measured. The routing metric calculation module 610 of each node uses the measurements made by the link quality and load measurement module along with other information to calculate the routing metric for each node with which it communicates. The routing metric is updated periodically. The route selection module 615 determines/selects a route/path to forward/communicate data to a destination node based on the calculated routing metrics. Route selection module 615 exchanges the routing control messages and data with other nodes in the mesh network via the communications module 620. It should be noted that a node may have one or more radio communication interfaces and other communication interfaces. It is understood that the route selection module may actually be made up of several smaller units or combined with other modules herein described. It is further understood that the processes described herein (especially with respect to FIGS. 3 and 4) may be software, hardware, firmware or any combination thereof executed in or by the route selection module.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for locating a route between a source node and a destination node in an on-demand wireless network, said method comprising:
   flooding said on-demand wireless network with a route request message by said source node;
   receiving a route reply message to said route request message from a first intermediate node having a valid route to said destination node, wherein said first intermediate node responds to said route request message based on a condition of a flag in said route request message, and further wherein said first intermediate node resets said flag; and
   receiving in unicast a further route reply message from said destination node, said further route reply message including a best route selected by said destination node based on cumulative metrics received in route request messages received by said destination node, wherein if a temporary route is said best route then said further route reply message serves as a confirmation and if said temporary route is not said best route then said further route reply message serves to establish said best route upon receipt of said further route reply message by said source node.

2. The method according to claim 1, wherein said receiving act thereby establishes a temporary route between said source node and said destination node of said wireless network.

3. The method according to claim 2, wherein said temporary route is available for transmission of data upon receipt of said route reply message by said source node.

4. The method according to claim 1, wherein said wireless network is a wireless mesh network.

5. The method according to claim 1, wherein said route reply message of said receiving act is unicast to said source node.

6. The method according to claim 1, wherein an address of said destination node is one of an internet protocol address and a media access control address.

7. The method according to claim 1, wherein said destination node includes destination nodes that are associated with one of a proxy and an access point.

8. The method according to claim 1, further comprising flooding said wireless network with a maintenance route request message in order to maintain a best metric route between nodes and to adapt to changes in network conditions.

9. The method according to claim 8, further comprising receiving a response to said maintenance route request message as if it is said route request message.

10. An apparatus for locating a route between a source node and a destination node in an on-demand wireless network, comprising:
    means for flooding said on-demand wireless network with a route request message by said source node;
    means for responding to said route request message with a route reply message by a first intermediate node having a valid route to said destination node, wherein said first intermediate node responds to said route request message based on a condition of a flag in said route request message, and further wherein said first intermediate node resets said flag; and means for receiving in unicast a further route reply message from said destination node, said further route reply message based on cumulative metrics received in route request messages received by said destination node, wherein if a temporary route is said best route then said further route reply message serves as a confirmation and if said temporary forward route is not said best route then said further route reply message serves to establish said best route upon receipt of said further route reply message by said source node.

11. The apparatus according to claim 10, wherein said means for responding thereby establishes a temporary route between said source node and said destination node of said wireless network.

12. The apparatus according to claim 10, wherein said wireless network is a wireless mesh network.

13. The apparatus according to claim 10, wherein said route reply message of said means for receiving is unicast to said source node.

14. The apparatus according to claim 10, wherein an address of said destination node is one of an internet protocol address and a media access control address.

15. The apparatus according to claim 10, wherein said destination node includes destination nodes that are associated with one of a proxy and an access point.

16. The apparatus according to claim 10, further comprising means for flooding said wireless network with a maintenance route request message in order to maintain a best metric route between nodes and to adapt to changes in network conditions.

17. The apparatus according to claim 16, further comprising means for receiving a response to said maintenance route request message as if it is said route request message.

18. The apparatus according to claim 10, wherein said temporary route is available for transmission of data upon receipt of said route reply message by said source node.

19. A method for locating a route between a source node and a destination node in an on-demand wireless network, said method comprising:
receiving a route request message from said source node;
responding to said route request message with a route reply message by a first intermediate node having a valid route to said destination node, wherein said first intermediate node responds to said route request message based on a condition of a flag in said route request message, and further wherein said first intermediate node resets said flag; and
receiving, by said first intermediate node, in unicast a further route reply message from said destination node, said further route reply message including a best route selected by said destination node based on cumulative metrics received in route request messages received by said destination node, wherein if a temporary route is said best route then said further route reply message serves as a confirmation and if said temporary route is not said best route then said further route reply message serves to establish said best route upon receipt of said further route reply message by said source node.

20. The method according to claim 19, further comprising:
updating said route request message; and
flooding said on-demand wireless network with said route request message.

21. The method according to claim 20, wherein said updating act further comprises updating said flag and updating a metric in said route request message with a cumulative metric of said route between said source node and said intermediate node.

22. The apparatus according to claim 20, wherein said means for updating further comprises means for updating said flag and means for updating a metric in said route request message with a cumulative metric of said route between said source node and said intermediate node.

23. The method according to claim 19, wherein said responding act thereby establishes a temporary route between said source node and said destination node of said on-demand wireless network.

24. The method according to claim 23, wherein said temporary route is available for transmission of data upon receipt of said route reply message by said source node.

25. The method according to claim 19, wherein said on-demand wireless network is a wireless mesh network.

26. The method according to claim 19, wherein said route reply message of said responding act is unicast to said source node.

27. The method according to claim 19, wherein an address of said destination node is one of an internet protocol address and a media access control address.

28. The method according to claim 19, wherein said destination node includes destination nodes that are associated with one of a proxy and an access point.

29. The method according to claim 19, further comprising responding to a maintenance route request message as if it is said route request message.

30. An apparatus for locating a route between a source node and a destination node in an on-demand wireless network, comprising:
means for receiving a route request message from said source node; and
means for responding to said route request message with a route reply message by a first intermediate node having a valid route to said destination node, wherein said first intermediate node responds to said route request message based on a condition of a flag in said route request message, and further wherein said first intermediate node resets said flag; and
means for receiving, by said first intermediate node, in unicast a further route reply message from said destination node, said further route reply message based on cumulative metrics received in route request messages received by said destination node, wherein if a temporary route is said best route then said further route reply message serves as a confirmation and if said temporary forward route is not said best route then said further route reply message serves to establish said best route upon receipt of said further route reply message by said source node.

31. The apparatus according to claim 30, further comprising:
means for updating said route request message; and
means for flooding said on-demand wireless network with said route request message.

32. The apparatus according to claim 30, wherein said means for responding thereby establishes a temporary route between said source node and said destination node of said on-demand wireless network.

33. The apparatus according to claim 32, wherein said temporary forward route is available for transmission of data frames upon receipt of said route reply message by said source node.

34. The apparatus according to claim 30, wherein said on-demand wireless network is a wireless mesh network.

35. The apparatus according to claim 30, wherein said route reply message of said means for responding is unicast to said source node.

36. The apparatus according to claim 30, wherein an address of said destination node is one of an internet protocol address and a media access control address.

37. The apparatus according to claim 30, wherein said destination node includes destination nodes that are associated with one of a proxy and an access point.

38. The apparatus according to claim 30, further comprising means for responding to a maintenance route request message as if it is said route request message.

* * * * *